(12) United States Patent
Wallace

(10) Patent No.: US 11,782,178 B2
(45) Date of Patent: Oct. 10, 2023

(54) HYBRID SEISMIC ACQUISITION WITH WIDE-TOWED

(71) Applicant: SHEARWATER INVEST AS, Lajsevåg (NO)

(72) Inventor: James Wallace, Surrey (GB)

(73) Assignee: SHEARWATER INVEST AS, Lajsevåg (NO)

( * ) Notice: Subject to any disclaimer, the term of this patent is extended or adjusted under 35 U.S.C. 154(b) by 114 days.

(21) Appl. No.: 17/442,687

(22) PCT Filed: Mar. 11, 2020

(86) PCT No.: PCT/NO2020/050067
§ 371 (c)(1),
(2) Date: Sep. 24, 2021

(87) PCT Pub. No.: WO2020/197403
PCT Pub. Date: Oct. 1, 2020

(65) Prior Publication Data
US 2022/0179115 A1    Jun. 9, 2022

(30) Foreign Application Priority Data
Mar. 25, 2019   (NO) .................................. 20190400

(51) Int. Cl.
*G01V 1/38*   (2006.01)
(52) U.S. Cl.
CPC .......... *G01V 1/3808* (2013.01); *G01V 1/3852* (2013.01); *G01V 2210/1293* (2013.01); *G01V 2210/1427* (2013.01)

(58) Field of Classification Search
CPC ............... G01V 1/3808; G01V 1/3852; G01V 2210/1293; G01V 2210/1427; G01V 1/20
See application file for complete search history.

(56) References Cited

U.S. PATENT DOCUMENTS 6,704,244 B1    3/2004 Vaage
6,903,998 B2 *  6/2005 Vaage ...................... G01V 1/36
                                                          367/24
(Continued)

FOREIGN PATENT DOCUMENTS

EP    2690467        1/2014
GB    2394051 A  *  4/2004  ............... G01V 1/36
(Continued)

OTHER PUBLICATIONS

International Search Report Issued in PCT/NO2020/050067, dated Feb. 6, 2020, pp. 1-3.
(Continued)

*Primary Examiner* — Ian J Lobo
(74) *Attorney, Agent, or Firm* — Jeffrey S. Melcher; Melcher Patent Law PLLC (57) ABSTRACT

The present invention concerns a system for marine seismographic data acquisition, in particular for use in survey design. The invention provides a method for marine seismographic acquisition whereby subsea data and information can be collected using sea floor receivers and suspended receivers simultaneously. This is achieved by aligning the geometries of the two acquisition techniques and utilizing a system of wide-towed seismic sources that produce seismic energy on all the source point locations required to fulfil both acquisition methods.

4 Claims, 4 Drawing Sheets

(56) References Cited

U.S. PATENT DOCUMENTS

2014/0376330 A1   12/2014   Howieson
2019/0064380 A1    2/2019   Sharma

FOREIGN PATENT DOCUMENTS

WO    2017102289    6/2017
WO    2018067016    4/2018

OTHER PUBLICATIONS

Written Opinion Issued in PCT/NO2020/050067, dated Feb. 6, 2020, pp. 1-4.

* cited by examiner

HYBRID SEISMIC ACQUISITION WITH WIDE-TOWED

BACKGROUND

Field of the Invention

The present invention concerns a system for marine seismographic data acquisition, in particular for use in a survey design.

Prior and Related Art

A marine seismic survey involves a towing vessel towing an acoustic source, which generates pressure waves that travel down through a body of water into a subsea formation. Boundary layers between materials with different acoustic impedance reflect the acoustic energy. Seismic acquisition devices sample the resulting wave fields for later processing.

The acoustic source can be a device that propagates acoustic energy by means of controlled ejection of compressed air or electric charge. More precisely, the source emits acoustic energy in a series of 'shots', where each shot is a short pulse of P-waves. In this document, a 'streamer array' is an acquisition device able to sample a resulting P-wave field in the body of water, and a 'seafloor array' is an acquisition device able to sample P and S-waves on the seafloor.

As terms are used herein, the streamer array contains a set of suspended receivers and the seafloor array contains a set of seafloor receivers. Seismic receivers may contain hydrophones able to detect pressure differences and geophones able to detect displacement and velocity vectors on the scale of seismic reflections from the underground. For example, so-called four component (4C) receivers contain one hydrophone and three mutually orthogonal geophones or accelerometers. Suitable receivers are known in the art and need no further description herein.

The seismic survey is designed to adequately sample and reconstruct seismic wave fields such that the details of the subsea formation can be accurately imaged. The design can be broken down into two elements—source points and receiver points. These cover a certain geographical region called the survey area. The positions of the source and receiver points must be close enough to satisfy spatial sampling requirements in both an inline and a crossline direction. Classical sampling satisfies Shannon-Nyquist criteria known in the art.

Traditionally, acquisition using a streamer array or a seafloor array rely on separate approaches to fulfil the source and receiver position requirements.

Seismic acquisition with a streamer array usually relies on a towing vessel to move the suspended receivers progressively across the survey area. The streamer array has at least one streamer. Multiple streamers are required for 3D seismic. Each streamer contains a string of suspended receivers, usually at a fixed spacing along the streamer. The string of receivers is housed within a protective casing, which also contains a medium providing near neutral buoyancy so that the receivers can be kept at a consistent depth below the sea surface. The same vessel is often used to also tow the seismic sources from one source position or shot point to the next. The sources are usually towed between the stern of the vessel and the start of the seismic streamers. The sources and streamers are intrinsically linked because both are connected to the towing vessel, and so this technique is constrained to a relatively narrow angle range of reflection energy. The technique is often referred to as Narrow Azimuth Towed Streamer (NATS).

Conventionally, the crossline distance between the sources equals the distance between streamers divided by the number of sources, and the inline distance between the sources and the foremost receivers in the streamers is as small as possible. The survey is performed by steering the centre of the sources along predetermined sail lines. The crossline spacing between sail lines depends on the subsurface coverage width, which is defined by the midpoints between source and receivers.

Specifically, a common mid-point (CMP) gather collects traces from individual receivers in bins with sides equal to the distance between midpoints between sources and receivers. In other words, the bin-sizes in a CMP gather depend on $\Delta r/2$ where $\Delta r$ is the distance between receivers.

Seismic acquisition with a seafloor array relies on a vessel to deploy the seafloor receivers. The seafloor receivers can be contained within a protective housing referred to as an Ocean Bottom Cable (OBC). Alternatively, each seafloor receiver can be cased in a protective housing referred to as an Ocean Bottom Node (OBN), which may be attached to a wire or rope. Thus, the OBNs can be deployed as a string or individually. Collectively OBC and OBN is referred to as Ocean Bottom Seismic (OBS). Again, a towing vessel is often used to tow the seismic source from one source location to the next along pre-determined source lines, which can be parallel or orthogonal to the receiver lines. Since the source and receivers are decoupled, each source line can be shot discretely with one towed source. Alternatively, multiple sources that have a crossline separation matching the crossline spacing of the source lines can be towed so that multiple source lines can be efficiently acquired at the same time. This technique has the flexibility to have a large angle range of reflection energy and is often referred to as Full Azimuth (FAZ).

Additionally, FAZ is capable of measuring S-waves as well as P-waves, while NATS can only measure P-waves. Since S-waves do not travel through fluids, measuring S-waves requires good acoustic couplings between the seafloor receivers and the seafloor.

While the geometries of sources and receivers differ in the respective standard configurations, the techniques follow a similar strategy in source design and method of moving the source from one source point to the next.

A major objective of the present invention is to benefit from both marine seismic acquisition techniques while avoiding or reducing costs associated with separate acquisition. A further objective is to avoid or reduce compromises associated with fulfilling the requirement of one technique and not the other.

A general objective is to provide an improved method for acquiring marine seismic data, which solves or reduces problems from prior art.

SUMMARY OF THE INVENTION

The objectives are achieved by the method according to claim 1. Further features and benefits appear in the dependent claims. In the claims, we follow the convention that articles 'a', 'an' and 'the' means at least one, whereas 'one' means exactly one.

More particularly, the objectives are obtained by a method for acquiring subsea marine seismic data with a vessel towing streamers comprising the steps of:

defining a horizontal inline axis X that is parallel to a direction the vessel is travelling and a horizontal crossline axis Y perpendicular to the inline axis over a survey area, determining a first distance along the X-axis and a second distance along the Y-axes corresponding to a bin size for S-waves based on spatial sampling requirements for S-waves, determining a third distance along the X-axis and a fourth distance along the Y-axes corresponding to a bin size for P-waves based on spatial sampling requirements for P-waves, defining a sail line parallel to the X-axis, and for each sail line:

arranging a set of $N_2$ seafloor receiver lines parallel to the X-axis, arranging a set of n equally spaced source lines parallel to the X-axis with equal spacing $y_1$ between the source lines, and at least one source line laying between adjacent seafloor receiver lines, moving the source lines along the Y-axis such that the distance between a source line and an adjacent seafloor receiver line becomes equal to or less than twice the second distance, defining a crossline distance to a next sail line equal to n times the distance $y_1$ between adjacent source lines, determining a shot interval equal to or less than twice the first distance, arranging a set of N streamer lines over the source lines and seafloor receiver lines such that crossline distances between a source line and an adjacent seafloor receiver line or an adjacent streamer line is equal to or less than twice the fourth distance, and if necessary, reducing the shot interval to twice the third distance.

Midpoints between a shot point and a nearby receiver determine the bin size, so minimum distances between shot points and receivers along the X and Y-axes are twice as long as the bin dimensions. One or more source lines between the seafloor receiver lines reduce the first crossline distance, and thereby the bin size for S-waves and P-waves acquired by the seafloor receivers. Streamer lines interleaved with seafloor receiver lines reduce the bin size for P-waves, or alternatively enable wider receiver spacings in the crossline direction. Further, the method enables simultaneous acquisition of data from the seafloor receivers and the streamer array with one source array. This reduces operational costs.

After defining lines and shot points, it is possible to deploy seafloor receivers along the seafloor receiver lines at inline distances computed from the second distance and a shot point. The sea floor receivers are positioned using acoustics, compasses and tilt sensors so that they are accurately placed on the ocean bottom at pre-determined inline and crossline locations depending on the survey requirements.

The method may further comprise the step of actually towing a source array with n acoustic sources having equal spacing $x_0$ between adjacent sources at a first depth below a sea surface, with a centre of the source array along the sail line. It is understood that each source follows a source line, thereby locating the sail line on the X-axis. Further, known equipment on the towing vessel control the sources to fire or emit acoustic energy at the shot points.

The method may further comprise the step of actually towing a streamer array at a second depth below the sea surface with a centre of the streamer array along the sail line.

The streamer array is preferably towed behind the source array. In principle, the streamer array may be towed by a separate vessel.

Suspended receivers are positioned along each seismic streamer at fixed inline positions and, using acoustics, compasses and pressure transducers, are kept at a known crossline distance from each other and below the sea surface.

The suspended receiver element utilizes the same sources and source paths as the sea floor receiver element so that no additional source lines are required for either technique. The receiver crossline spacing then becomes a function of the source crossline spacing and is determined by the spatial sampling requirements.

Inline, consecutive source locations or shot points are close enough to achieve a desired bin fold and offset distribution depending on a maximum offset from source to sea floor receiver and the length of the seismic streamer.

In this manner, there is complete alignment between the crossline spacing between the sea floor receiver and source lines and the suspended receiver subsurface coverage width.

BRIEF DESCRIPTION OF THE DRAWINGS

The invention will be explained in the following detailed description with reference to the attached drawings, in which.

DETAILED DESCRIPTION OF PREFERRED EMBODIMENTS

The drawings illustrate example configurations and are not to scale. Several details known to those skilled in the art are omitted for clarity of illustration.

FIGS. 1-3

Figure 1:
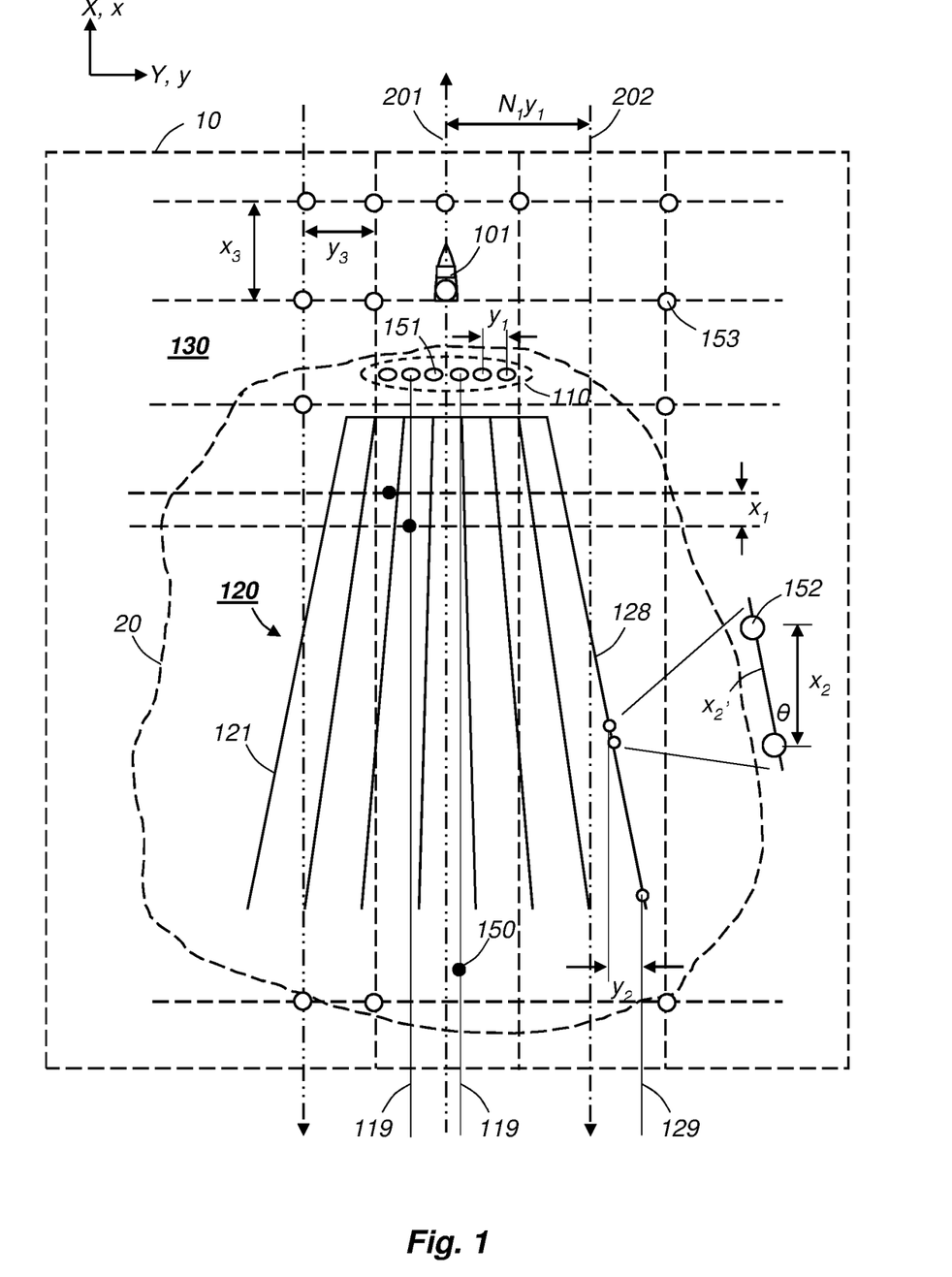
FIG. 1 illustrates a context for the invention and notation used in this document.
Figure 2:
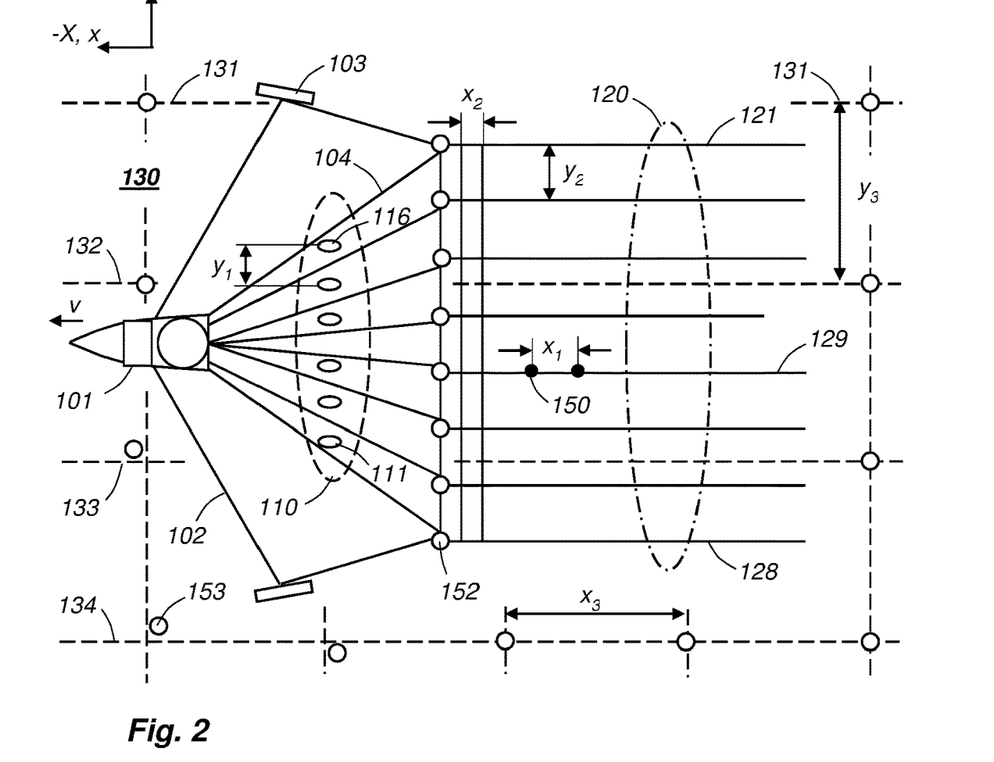
FIG. 2 is a top view illustrating a towing vessel and further details.
Figure 3:
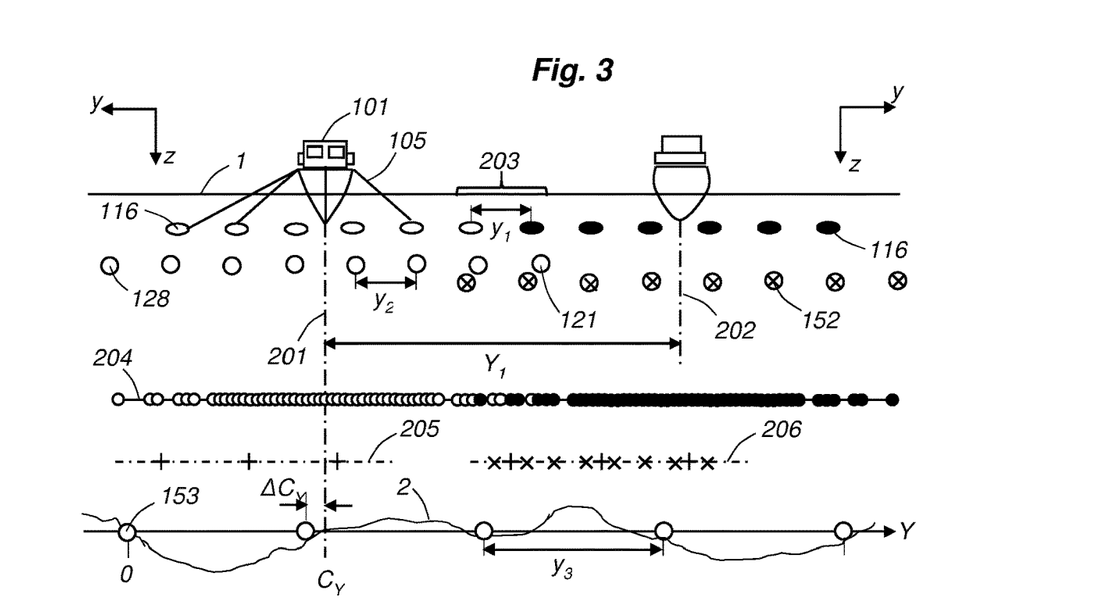
FIG. 3 is a front view illustrating the towing vessel sailing along adjacent sail lines.
Figure 4:
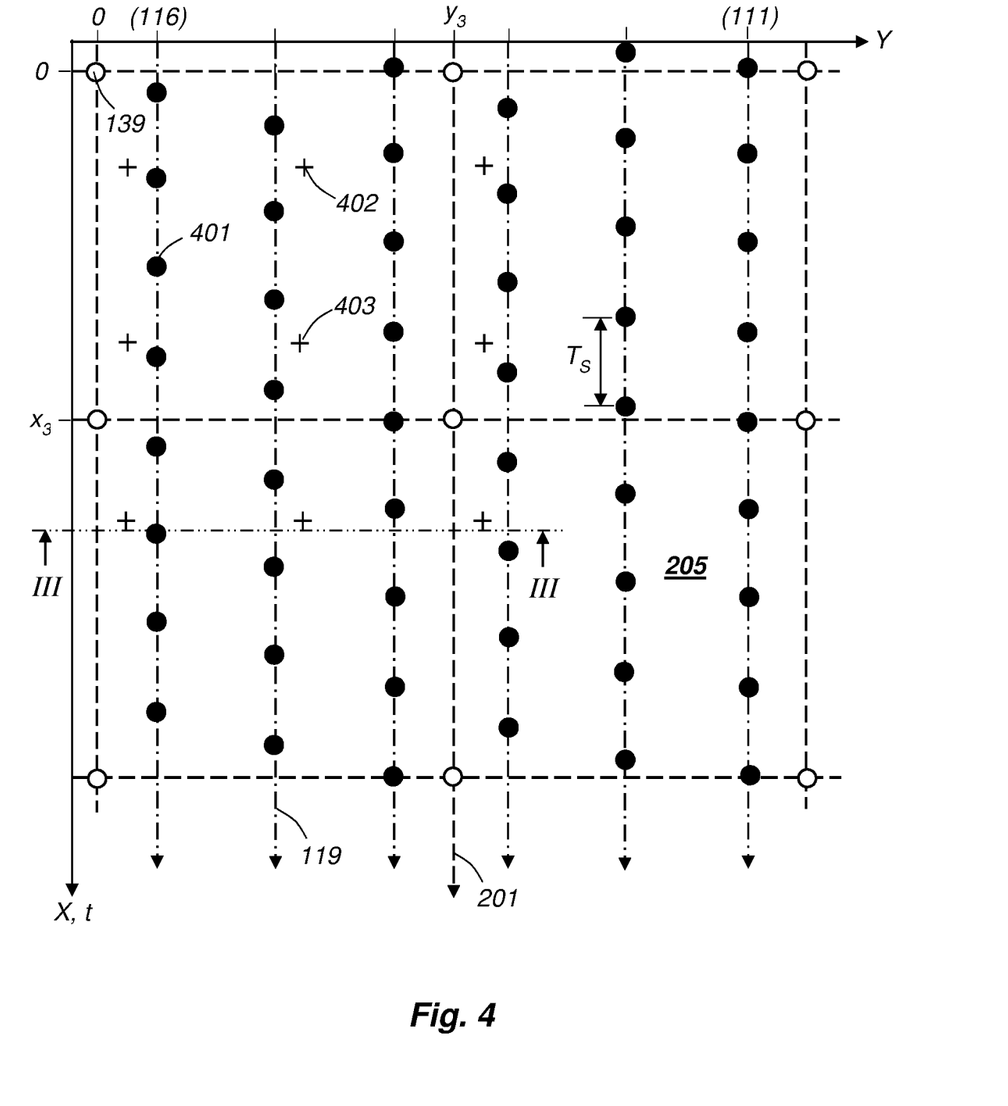
FIG. 4 is a top view illustrating a configuration around one sail line shown in FIG. 3, and FIGS. 5-8 illustrate shot patterns.

FIGS. 1-3 illustrate configurations, definitions and notation used in this document.

FIG. 1 is a use diagram schematically illustrating a survey plan. A vessel 101 illustrates towing along a planned sail line 201. For completeness, we will describe common tackle 102-105 with reference to FIG. 2.

In this document, capital letters X, Y, Z denote global, right-handed Cartesian coordinates with the sail line 201 pointing in the direction of the X-axis and the Z-axis pointing downwards. Lower case letters x, y, z are vessel bound Cartesian coordinates with the x-axis mid-ship from stern to bow, y-axis mid-ship from port to starboard and z-axis pointing downwards. The x-axis point in the direction of the X-axis during a pass along a sail line 201, and in the opposite direction (−X) during a pass along an adjacent sail line 202.

We will use the term 'inline' for directions parallel to the X-axis and 'crossline' for directions parallel to the Y-axis. In reality, water currents etc. will cause 'feathering', e.g. curved streamers in the XYZ-system. That is, in this document 'inline' does not mean 'along streamers' and 'crossline' does not mean 'perpendicular to the streamers'.

We adhere to the common convention of assigning traces from suspended receivers 152 to bins. The bins in a common midpoint (CMP) gather lie in a projection plane. This does not mean we assume a flat seafloor. Further, a rectangular grid of bins is equivalent to a rectangular grid of midpoints of the bins—these two regular grids are just displaced half a bin size from each other. For illustrative purposes, FIGS. 1-3 show acoustic sources 151, suspended receivers 152 and seafloor receivers 153 on a regular grid. This should be interpreted as 'resampling on a regular grid' rather than an unrealistic idealisation.

A dashed rectangle 10 illustrates the area of interest in the present invention. In this area, seafloor receivers 153 are deployed to detect S-waves. The sail lines 201, 202 extend past the rectangle 10 to illustrate that there may be a larger survey area in which traditional P-P acquisition suffices.

A dashed border 20 illustrates a region with an increased demand for resolution. We assume reduced bin-sizes within the border 20. Note that FIG. 1 shows the regions 10 and 20 small compared to a streamer array 120 for illustration. In real embodiments, the regions 10 and 20 are several times bigger than the streamer array 120 in both the X and Y-directions.

A source array 110 comprises $N_1$ acoustic sources 151 at a regular crossline distance $y_1$ between adjacent sources. When towed, each source 151 generates a shot line 119 parallel to the X-axis. The shot lines 119 are also known as 'source lines'. Filled circles illustrate shot points 150, specifically points in space and time at which an acoustic source 151 should release an acoustic pulse according to the survey plan. The crossline distance between adjacent shot lines 119 equals the distance $y_1$ between adjacent sources 151. A related inline distance $x_1$ corresponds to the inline distance between consecutive shot points 150.

If we assume equidistant shot lines 119 over the area 10, the distance between adjacent sail lines 201, 202 is $N_1 y_1$ and the width of array 110 is $(N_1-1)y_1$. In FIG. 1, $N_1=6$ so the width of array 110 is $5y_1$ and the distance between the sail lines 201 and 202 is $6y_1$. Numbered examples 1-3 below regard an overlap region where the distance between outermost shot lines during adjacent passes is not necessarily equal to $y_1$.

A streamer array 120 has 8 streamers 121-128 in this example. FIG. 1 illustrates a fan-out in which each streamer 121-128 forms an angle $\theta \neq 0$ with the X-axis. We distinguish between 'fan-out', which is intentional, and 'feathering' due to external forces such as sea currents. Either way, each suspended receiver 152 in the streamer array 120 generates a receiver line 129, and the number of receiver lines $N_2$ quickly becomes greater than the number of streamers. The fan-out in FIG. 1 intentionally enables decreased bin sizes and increased resolution. This is relevant in the region 20.

An enlarged view of two adjacent suspended receivers 152 illustrates that $x_2 = x_2' \cos \theta$ where $x_2'$ is the distance between adjacent receivers measured along streamer 121. For example, $x_2' = 12.5$ m is a typical distance in a modern streamer. An angle $\theta=37°$ yields $x_2$ about 10 m, and an inline bin size reduced from 6.25 m to 5.0 m. Of course, crossline bin-sizes are simultaneously reduced by multiplication with $\sin \theta$.

In short, fan-out enables reduced bin sizes for P-waves within the border 20, and our definitions of 'inline' and 'crossline' differ from the definition 'along' and 'across' streamers.

In FIG. 1, each sail line 201 and 202 coincides with a seafloor receiver line, and there is one seafloor receiver line on either side of the sail line. The seafloor receiver line halfway between the sail lines 201, 202 is utilised during passes along the respective sail lines 201 and 202. In general, the crossline distance between adjacent seafloor receivers 153 in array 130 is $y_3$, and the corresponding inline distance is $x_3$. Recall that FIG. 1 illustrates a plan.

FIG. 2 is a schematic top view of the vessel 101 towing the source array 110 and the streamer array 120 over the seafloor array 130. We do not repeat the description of notation and reference numerals that were explained with reference to FIG. 1.

In FIG. 2, we assume that the vessel 101 travels with a constant speed v along a return path, i.e. in the −X direction. Vessel bound coordinates x, y, z are as in FIG. 1.

Winches on the vessel 101 and ropes 102 connected to paravanes 103 control the width of the streamer array 120. Birds (not shown) along each streamer 121-128 may provide additional control, for instance to compensate for feathering and/or create an intentional fan-out as shown in FIG. 1. Birds and streamers with near neutral buoyancy facilitate depth control. Online searches for keywords in the present paragraph will reveal further details. Streamer control as such is outside the scope of the present invention and need no further explanation herein.

There are numerous alternatives for providing towing forces, communication and power to the arrays 110 and 120. Without loss of generality, we assume that the ropes 102 comprise steel wires and/or synthetic fibres able to exert a towing force. Further, we assume that cables 104 from the vessel 101 to the streamers 121-128 contain ropes 102 plus communication lines for transferring data. Finally, in this example umbilicals 105 are cables 104 with additional power supply lines for supplying pressurized air and/or electric power to the source array 110.

In FIG. 2 and later examples, acoustic sources 151 in the source array 110 have reference numerals 111-116 from port to starboard. At towing speed v, the inline distance between adjacent shot points 150 along a shot line 119 becomes $x_1 = vT_S$, where $T_S$ is a shot interval measured in seconds. A minimum time interval is required to recharge an acoustic source 151. This affects shot patterns that will be described with reference to FIGS. 4-8.

In FIG. 2, the streamers 121-128 are parallel to the sailing direction x. Thus, the number of receiver lines 129 trailing behind suspended receivers 152 becomes $N_2=8$ in this example. Further, the vessel 101 is sailing between seafloor lines 132 and 133, not directly above a seafloor receiver line as in FIG. 1. As noted, regular grids defining bins and mid-points of bins are equivalent. Three seafloor receivers 153 in the lower left of FIG. 2 are displaced from regular grid intersections to illustrate that real data may be resampled on a regular grid. Exact deployment of seafloor receivers 153 on grid intersections is of course unrealistic in practical surveys.

FIG. 3 is a schematic view of the vessel 101 on a sea surface 1 during two adjacent passes 201 and 202. In FIG. 3, the global X-axis would point out of the paper plane. The streamer array 120 is wider than the source array 110 and defines an overlap area 203 between sail lines, on the port side of vessel 101 in FIG. 3. The distance $y_1$ between the outermost port sources during the two passes 201 and 202 is an example. We will describe other distances in numbered examples 1-3.

An irregular line illustrates a 'realistic' seafloor 2. We will only consider midpoints between shots and receivers projected onto horizontal projection planes 204-206, so the seafloor receivers 153 are shown at regular intervals along the global Y-axis.

For later reference, we assume that sail line 201 is at a constant $C_Y$ in global coordinates. That is, vessel bound coordinates $y=Y-C_Y$. A crossline midpoint $(y_1+y_2)/2=(Y_1+Y_2-2C_Y)/2=(Y_1+Y_2)/2-C_Y$. In words, a midpoint between global coordinates $Y_1$ and $Y_2$ is the constant $C_Y$ plus the midpoint between corresponding vessel bound coordinates $y_1$ and $y_2$. Next, we assume that the sail line 201 is displaced $\Delta C_Y$ from the nearest line of seafloor receivers 153, and that the crossline distance between seafloor receivers is $y_3$. Since the sources 151 is symmetric about sail line 201 and seafloor receivers 153 are displaced $\Delta C_Y + ny_3$ from the sail line, the midpoints are displaced by $\Delta C_Y/2$.

Ellipses near the sea surface 1 represent the acoustic sources 151. Unfilled ellipses illustrate sources along sail line 201 and filled ellipses illustrate sources along sail line 202. Each source 111-116 is connected to the vessel 101 by an umbilical 105. Ropes 102, paravanes 103, cables 104 and several umbilicals 105 are omitted in FIG. 3 for clarity.

Large circles near the sea surface 1 represent suspended receivers 152 in streamers 121-128. Unfilled circles illustrate receivers along sail line 201, and circles with crosses illustrate receivers along sail line 202. As noted, each streamer 121-128 contains receivers 152 at regular intervals.

The horizontal projection plane 204 illustrates a cross section of a common mid-point (CMP) gather acquired by the sources 111-116 and the streamers 121-128. In this particular configuration, midpoints may be grouped into groups of four. Near the outermost sources 111, 116 and streamers 121, 128, the outermost groups lack 3, 2, and 1 midpoints, respectively. We will return to this in numbered examples 1-3.

The horizontal projection plane 205 shows a subset of a CMP-gather acquired by the source 111 and three seafloor receivers 153.

The horizontal projection plane 206 illustrates a combination of midpoints between sources in array 110 and suspended receivers 152, and between sources in array 110 and seafloor receivers 153. The 'x'-symbols relate to suspended receivers 152 and the '+'-symbols relate to seafloor receivers 153.

In the following, a 'grid cell' has dimensions $x_0 \times y_0$ and a 'bin' has dimensions $mx_0 \times ny_0$ where m and n are integers $\geq 1$. For example, traces from suspended receivers 152 in a 3D survey may define a 'natural grid' with P-wave bins $x_P \times y_P = x_0 \times y_0 = 6.25 \times 6.25$ m$^2$. In a later example, S-wave bins are $x_S \times y_S = 4x_0 \times 6y_0 = 25.0 \times 37.5$ m$^2$. During later processing, traces may be assigned to even larger bins.

For example, P-SV data may be assigned to bins in a common conversion point (CCP) gather, in which optimal bin sizes depend on formation properties and the bins must be neither too small nor too large for optimal imaging. The sides in a CCP bin might be in the range 45-60 m rather than the ~5 to 10 m of a CMP bin for P-P acquisition. Alternatively, traces from all S-wave bins with centres within an optimal radius may be assigned to a round CCP-bin for use in the later processing of P-SV data. The present invention concerns seismic data acquisition, which account for later processing by means of a suitable grid.

In the following, we assume cell sizes $x_0 \times y_0$ equal to the bin size in a CMP-gather during P-P acquisition. Recall that fan-out reduces $x_0$ and $y_0$, e.g. from 6.25 m determined by streamer design. With the definitions above, $x_0$ is the distance between midpoints along the X-axis and $y_0$ is the distance between midpoints along the Y-axis. Further, $x_1$ to $x_3$ and $y_1$ to $y_3$ are multiples of $x_0$ and $y_0$, respectively We will use the following notation:

$x_1 = m_1 x_0$, $y_1 = n_1 y_0$, $x_2 = m_2 x_0$, $y_2 = n_2 y_0$, $x_3 = m_3 x_0$ and $y_3 = n_3 y_0$, where $m_1$ to $m_3$ and $n_1$ to $n_3$ are integers.

A midpoint $\mathbf{M}_{ij} = (\mathbf{S}_i + \mathbf{R}j)/2$ where bold letters indicate (X, Y)-coordinates, $\mathbf{S}_i$ is a source position and $\mathbf{R}j$ is a receiver position. We will use lower case $m_{ij}$ for decompositions in vessel bound coordinates.

Crossline Configuration of Sources and Suspended Receivers

We assume that the vessel 101 will tow the source array 110 approximately 100 m in front of the streamer array 120, and that both arrays 110 and 120 are symmetric about a sail line 201, 202. In the crossline direction and vessel bound coordinates, the midpoint becomes $$m_{ij} = c + iy_1/2 + jy_2/2 \qquad (1)$$

where i and j are integers and c is a constant.

Example 1: Crossline Midpoints on Plane 204

Assume $N_1=6$ sources 111-116 and $N_2=8$ parallel streamers 121-128 as in FIGS. 2 and 3. Further, $n_1=8$, $n_2=10$ and $y_0=6.25$ m give $y_1=50$ m between sources 151 and $y_2=62.5$ m between suspended receivers 152 in parallel streamers.

In this example, the width of source array 110 is $5 \cdot 50 = 250$ m. With $y=0$ on a sail line 201 or 202, the sources 111-116 are located at 50 m intervals from $-125$ to $+125$ m. The middle sources 113, 114 are located at $-25$ and $+25$ m. Similarly, the width of streamer array 120 is $7 \cdot 62.5 = 437.5$ m and the receivers are located at 62.5 m intervals from $-218.75$ to $+218.75$ m. The middle receivers are located at $-31.25$ and $+31.25$ m. Thus, when $y=0$ on the sail line, the outermost midpoints $\pm M_0$ are $\pm(125+218.75)/2 = \pm171.88$ m from the sail line, and the middle midpoints are $\pm(-25+31.25)/2 = \pm 3.125$ m from the sail line.

The width of source array 110 is $(N_1-1)y_1/2$ and the distance between sources is $y_1 = n_1 y_0$. Similarly, the width of streamer array 120 is $(N_2-1)y_2/2$ and the distance between suspended receivers is $y_2 = n_2 y_0$. According to equation (1), we may obtain midpoints simply by adding multiples of $y_1/2$ and $y_2/2$ to a constant c. In order to get positive indices $i=0$ to $(N_1-1)$ and $j=0$ to $(N_2-1)$, we change origin to the outermost port midpoint. That is:

$$m_{ij} = [-(N_1-1)y_1/2 + iy_1 - (N_2-1)y_1/2 + jy_2]/ \qquad (2)$$
$$2 = [-M_0 + in_1/2 + jn_2/2]y_0 \text{ where}$$

$$i = 0 \text{ to } (N_1-1), j = 0 \text{ to } (N_2-1) \text{ and} \qquad (3)$$
$$M_0 = [(N_1-1)n_1 + (N_2-1)n_2]/4.$$

Note that changing origin from $y=0$ on the sail line to $y=0$ at $-M_0 y_0$ corresponds to changing the constant c in (1) from $c=0$ to $c=-M_0 y_0$.

It is practical to 'factor out' $y_0$ to simplify changing grid sizes, e.g. from 6.25 m to 5.0 m. Inserting $N_1=6$, $N_2=8$, $n_1=8$ and $n_2=10$ in (2) yields $m_{ij}=[-27.5+4i+5j]y_0$ where $i=0-5$ and $j=0-7$. Table 1 contains the values of $[-27.5+4i+5j]$ arranged in $N_1=6$ rows and $N_2=8$ columns:

TABLE 1

Values of (−27.5 + 4i + 5j)

| i | 0 | 1 | 2 | 3 | 4 | 5 | 6 | 7 |
|---|---|---|---|---|---|---|---|---|
| 0 | −27.5 | −22.5 | −17.5 | −12.5 | −7.5 | −2.5 | 2.5 | 7.5 |
| 1 | −23.5 | −18.5 | −13.5 | −8.5 | −3.5 | 1.5 | 6.5 | 11.5 |
| 2 | −19.5 | −14.5 | −9.5 | −4.5 | 0.5 | 5.5 | 10.5 | 15.5 |
| 3 | −15.5 | −10.5 | −5.5 | −0.5 | 4.5 | 9.5 | 14.5 | 19.5 |
| 4 | −11.5 | −6.5 | −1.5 | 3.5 | 8.5 | 13.5 | 18.5 | 23.5 |
| 5 | −7.5 | −2.5 | 2.5 | 7.5 | 12.5 | 17.5 | .22.5 | 27.5 |

Equation (2) and Table 1 are essentially convenient ways to illustrate crossline midpoints independent of $y_0$. For example, $y_0$=6.25 m yields outermost midpoints at $\pm M_0 y_0 = \pm 27.5 \cdot 6.25 = \pm 171.88$ m. The midpoints closest to the sail line are at $\pm 0.5 \cdot 6.25 = \pm 3.125$ m, etc. These are equal to the values computed using y=0 on the sail line above and illustrate that the effect of moving origin from the sail line is to add a constant, here $-M_0 y_0$.

Of course, a different $y_0$ yields different distances in metres. For example, $y_0$=5.0 m in the region 20 yields $y_1$=40 m between sources and $y_2$=50 m between streamers. Table 1 remain unchanged provided $N_1$, $N_2$, $n_1$ and $n_2$ remain unchanged, so we obtain new midpoints by multiplying the values in Table 1 by $y_0$=5.0 m rather than by $y_0$=6.25 m.

In Table 1, it is easily seen that the midpoint values increase by $n_1/2$=4 from one row to the next and by $n_2/2$=5 from one column to the next as expected from equation (2). This causes midpoint values separated by 1 in diagonals upwards to the right in Table 1. In general, the distance between adjacent midpoint values along such a diagonal may be found from equation (1):

$$m_{ij} - m_{(i+1)(j-1)} = [c + iy_1 + jy_2]/2 \\ - [c + (i+1)y_1 + (j-1)y_2]/2 \\ = (y_2 - y_1)/2 \quad (4)$$

Equation (4) shows that the distance between neighbours in a table diagonal is independent of c, i and j so we may set $(y_2-y_1)/2=y_x$ where $y_x$ is the crossline bin size $y_P$ or $y_S$ for P-waves or S-waves, respectively. Substituting $y_1=n_1 y_x$ and $y_2=n_2 y_x$ in equation (4) shows that $n_2=n_1+2$ gives the desired distance 1 between crossline midpoints that are neighbours along a 'table diagonal' upwards to the right.

Following diagonals in Table 1, it is easy to verify that the table contains midpoints at every unit step from −15.5 to 15.5. With $y_P=y_0$=6.25 m, this corresponds to crossline midpoints every 6.25 m from −96.88 to 96.88 m. Near the upper left and lower right corners, Table 1 'runs out of sources and streamers', so the diagonals become incomplete.

Specifically, the last diagonal with $n_1/2$=4 consecutive values within Table 1 contains values 12.5 to 15.5 and starts at i=5, j=4. An extension of the column j=4 with 3 elements in steps of $n_1/2$=4 would contain the values 16.5, 20.5 and 24.5. Starting from these values, there are three incomplete diagonals directed upward to the right:

d1 lacks 16.5 and contains 17.5, 18.5 and 19.5;
d2 lacks 20.5 and 21.5 and contains 22.5 and 23.5; and
d3 lacks 24.5, 25.5 and 26.5 and contains 27.5.

For later reference, d1 lacks 1 value, d2 lacks 2 values and d3 lacks 3 values, cf. the small circles on projection plane 204 in FIG. 3 and comments above.

A fourth diagonal to the right would lie entirely outside Table 1. It follows that the number of incomplete diagonals generally equals $(n_1/2-1)$. In this example, $(n_1/2-1)$=3 and the starting column is at j=7−3=4. By symmetry, there are similar incomplete diagonals in the upper left part of Table 1 with negative values.

Recall that $N_2$ is the number of receiver lines 129, not necessarily the number of streamers. In the present coordinates, incomplete diagonals on the port side start at $j=N_2-n_1/2$ for any $N_2$. Since the starting column correspond to an integer, $n_1$ must be even.

Table 2 illustrates passes along adjacent sail lines.

TABLE 2

| Midpoints in the overlap region 203 | | | | | | | | | | | |
|---|---|---|---|---|---|---|---|---|---|---|---|
| $m_n$ | 16.5 | 17.5 | 18.5 | 19.5 | 20.5 | 21.5 | 22.5 | 23.5 | 24.5 | 25.5 | 26.5 | 27.5 |
| 44 − $m_n$ | 27.5 | 26.5 | 25.5 | 24.5 | 23.5 | 22.5 | 21.5 | 20.5 | 19.5 | 18.5 | 17.5 | 16.5 |
| 48 − $m_n$ | | | | | 27.5 | 26.5 | 25.5 | 24.5 | 23.5 | 22.5 | 21.5 | 20.5 |
| Combo | 16.5 | 17.5 | 18.5 | 19.5 | 20.5 | 21.5 | 22.5 | 23.5 | 24.5 | 25.5 | 26.5 | 27.5 |

Row '$m_n$' represents the pass along sail line 201 and contains the values 16.5 to 27.5 from the incomplete diagonals d1 to d3. Values in bold typeface are present in Table 1, and values in normal typeface belong to the incomplete diagonals d1 to d3 outside Table 1.

During a return pass along an adjacent sail line, the outermost midpoint might fit into the first gap. Here, this would yield a distance between sail lines (16.5+27.5) $y_0=44 y_0$. With $y_0$=6.25 m, $44 y_0$=275 m.

Row '44−$m_n$' is obtained by subtracting values of $m_n$ from 44. Since (44−16.5)=27.5, (44−17.5)=26.5 etc., row '44−$m_n$' contains the values in row '$m_n$' in reverse order. Bold typeface indicate values within Table 1 as in row '$m_n$'. Every column has a value in bold typeface either in row '$m_n$' or in row '44−$m_n$', so all midpoints 16.5 to 27.5 would be covered by two passes along adjacent sail lines $Y_1=44 y_0$ apart.

As noted, an equal distance $y_1$ between shot lines 119 implies $Y_1=N_1 y_1$ between adjacent sail lines 201 and 202. In the present example, $N_1 y_1=6 \cdot 8 y_0=48 y_0$.

Row '48−$m_n$' contains cells from row '44−$m_n$,' shifted 48−44=4 columns to the right. With $y_0$=6.25 m, the displacement of columns corresponds to 'moving' the next sail line 202 to $Y_1=48 y_0$=300 m from the sail line 201.

Row 'Combo' represents the combined passes along sail lines 201 and 202 separated by $48 y_0$. The columns contains the values 16.5 to 27.5 in ascending order from sail line 201. The gap at 20.5 associated with sail line 201 is filled by the value 27.5 from Table 1 for line 202 because 48−27.5=20.5, etc. Graphically, a value in a column's row 'Combo' is bold if there is a bold value in the column's row '$m_n$,' and/or row '48−$m_n$,'. The values 16.5, 21.5 and 26.5 in normal typeface represent gaps called 'remaining gaps' in the following. In the CMP-gather, remaining gaps correspond to rows of empty bins parallel to the shot lines.

Shifting cells, here by 4 columns, will always leave a remaining gap in the first column, here at 16.5. Further, 21.5+26.5=48, so these remaining gaps appear in both rows '$m_n$' and '$48-m_n$'.

Table 2 assumes the overlap region 203 on the port side of vessel 101 and contains port to starboard coordinates. By symmetry, an overlap region 203 on the starboard side of vessel 101 and starboard to port coordinates would yield a similar table.

Example 2: A Different Configuration of Source and Streamer Arrays

In this example, we change $N_1$ from 6 to 7 and $n_1$ from 8 to 6. In order to keep the distance between values in a diagonal $(n_2-n_1)/2=1$, we set $n_2=6+2=8$. We keep $N_2=8$ parallel streamers as in Example 1. With $y_0=6.25$ m, we get $y_1=6·6.25=37.5$ m between sources and $y_2=8·6.25=50$ m between streamers. The distance $N_1n_1y_0$ becomes $7·6·6.25=262.5$ m. A reduced CMP-bin size $y_0=5.0$ m would yield $y_1=30$ m between sources and $y_2=40$ m between streamers. Equidistant shot lines 119 would yield $7·6y_0=42·5.0=210$ m between adjacent sail lines.

Next, we define starboard to port coordinates by changing sign on equation (2):

$$m_{ij} = [M_0 - in_1/2 - jn_2/2]y_0 \quad (5)$$

where $M_0=[(N_1-1)n_1+(N_2-1)n_2]/4$, i=0 to $(N_1-1)$ and j=0 to $(N_2-1)$ as before.

With values in Example 2, $m_{ij}=(6·6/4+7·8/4-3i-4j)y_0=(23-3i-4j)y_0$. Table 3 contains values of $(23-3i-4j)$ for i=0 to 6 and j=0 to 7.

TABLE 3

Values of (23 − 3i − 4j)

| | | | | j | | | | |
|---|---|---|---|---|---|---|---|---|
| i | 0 | 1 | 2 | 3 | 4 | 5 | 6 | 7 |
| 0 | 23 | 19 | 15 | 11 | 7 | 3 | −1 | −5 |
| 1 | 20 | 16 | 12 | 8 | 4 | 0 | −4 | −8 |
| 2 | 17 | 13 | 9 | 5 | 1 | −3 | −7 | −11 |
| 3 | 14 | 10 | 6 | 2 | −2 | −6 | −10 | −14 |
| 4 | 11 | 7 | 3 | −1 | −5 | −9 | −13 | −17 |
| 5 | 8 | 4 | 0 | −4 | −8 | −12 | −16 | −20 |
| 6 | 5 | 1 | −3 | −7 | −11 | −15 | −19 | −23 |

In Table 3, the first diagonal with $n_1/2=3$ consecutive elements contains the values 17, 16 and 15 when listed upwards to the right. In port to starboard coordinates, the values would be −17, −16 and −15, i.e. in ascending order simply due to the change of sign. Following diagonals, it is easy to verify that Table 3 contains all integers from −17 to 17.

On the left of Table 3, there are $(n_1/2-1)=2$ incomplete diagonals. When listed upwards to the right:
 d2 from i=0 contains the value 23 and lacks the values 22 and 21, and
 d1 from i=1 contains the values 20 and 19 and lacks the value 18.

Consistent with the naming in Example 1, d1 lacks 1 value and d2 lacks 2 values.

Table 4 is constructed in the same manner as Table 2, however with (18 10+23)=41 in the second row and $N_1n_1=42$ in the third row.

TABLE 4

Alternative midpoints in the overlap region 203

| $m_n$ | 18 | 19 | 20 | 21 | 22 | 23 |
|---|---|---|---|---|---|---|
| 41 − $m_n$ | 23 | 22 | 21 | 20 | 19 | 18 |
| 42 − $m_n$ | | 23 | 22 | 21 | 20 | 19 |
| Combo | 18 | 19 | 20 | 21 | 22 | 23 |

In this example, the remaining gaps in row 'Combo' become 18 and 21. Similar to Example 1, the first remaining gap, here at 18, is due to the shift of columns, here by (42−41)=1. In this example, the only other remaining gap is at 21 because (42−21)=21. This concludes Example 2.

The first lacking value $L_1$ in a table such as Table 1 or 3, that is 16.5 in Example 1 and 18 in Example 2, is found by extending the column which is $(n_1/2-1)$ from the edge of the table with $n_1/2$ from the last value in the column. After algebraic simplification:

$$L_1 = [(N_1 + 1)n_1 + (N_2 + 1)n_2 - n_1n_2]/4 \quad (5)$$

For an optimal distance between adjacent sail lines, we add equations (5) and (3):

$$L_1 + M_0 = [2N_1n_1 + 2N_2n_2 - n_1n_2]/4 = N_1h_1 + N_2h_2 - h_1h_2 \quad (6)$$

where $h_1=n_1/2$ and $h_2=n_2/2$.

With numbers from Example 1, equation (6) yields $L_1+M_0=(6·4+8·5-4·5)=44$. With numbers from Example 2, we obtain $L_1+M_0=(7·3+8·4-3·4)=41$.

Example 3: Yet Another Configuration of Source and Streamer Arrays

In this example, we reduce $N_1$ to 5 and increase $n_1$ to 10. We keep $N_2=8$ as in Examples 1 and 2, and set $n_2=12$ for the desired distance 1 between values in diagonals. From (3), $M_0=(4·10+7·12)/4=31$. Rather than creating a table similar to Tables 1 and 3 from $\pm(31-5i-6j)$, we use (5) to obtain $L_1=12$. $L_1+M_0=12+31=43$ may be obtained directly from (6). Since the number of incomplete diagonals is $n_1/2-1$ and the number of values in each incomplete diagonal is $n_1/2=h_1$ in all Examples 1-3, we may arrange the incomplete diagonals in blocks as illustrated in Table 5.

TABLE 5

Incomplete diagonals from Examples 1 to 3

| | Example 2<br>$h_1 = 3, N_1 = 7$ | | | Example 1<br>$h_1 = 4, N_1 = 6$ | | | | Example 3<br>$h_1 = 5, N_1 = 5$ | | | | |
|---|---|---|---|---|---|---|---|---|---|---|---|---|
| d1 | <u>18</u> | 19 | 20 | <u>16.5</u> | 17.5 | 18.5 | 19.5 | <u>12</u> | 13 | 14 | 15 | 16 |
| d2 | <u>21</u> | 22 | 23 | 20.5 | <u>21.5</u> | 22.5 | 23.5 | 17 | 18 | 19 | 20 | 21 |
| d3 | | | | 24.5 | 25.5 | <u>26.5</u> | 27.5 | <u>22</u> | <u>23</u> | 24 | 25 | 26 |
| d4 | | | | | | | | | <u>27</u> | <u>28</u> | 29 | 30 | 31 |

In each Example 1 to 3, $n_2=n_1+2$ and $N_2=8$. In each non-zero block in Table 5, the upper left and lower right values are $L_1$ from equation (5) and $M_0$ from equation (3). As before, values in bold typeface appear in a table similar to Table 1 or 3, whereas values in normal typeface belong to incomplete diagonals outside the table. The remaining gaps between two adjacent passes are underlined.

In Example 3, the distance $N_1 n_1 y_0$ between sail lines becomes $50 y_0$, and $L_1 + M_0 = 12 + 31 = 43$. In a table similar to Tables 2 and 4, the remaining gaps may be found by shifting a row '43–$m_n$' (50–43)=7 columns to obtain a row '50–$m_n$'. As noted in Example 1, such a shift always leave a gap. These are the remaining gaps at $L_1$ in all three blocks in Table 5.

Further, in the block for Example 3, we observe that (22+28)=(23+27)=50. Thus, in a table similar to Tables 2 and 4, the remaining gaps in parentheses would appear in the same column in rows '$m_n$' and '50–$m_n$'.

Lastly in Example 3, we note that, in addition to the remaining gaps at $L_1$, $h_1 = 3$ and $N_1 = 7$ leads to a single remaining gap at 21, $h_1 = 4$ and $N_1 = 6$ leads to one pair of remaining gaps 21.5 and 26.5, and $h_1 = 5$ and $N_1 = 5$ leads to two pairs of remaining gaps (22, 28) and (23, 27) where

23−22=28−27=1.

Example 4: Crossline Configuration of Sources and Seafloor Receivers

In this example, we assume a sail line 201 directly over a row of seafloor receivers as in FIG. 1. Further, we assume an S-bin size $y_S = 25$ m, distance between sources 50 m=$2 y_S$ and vessel bound coordinates. Analogous to previous results, we set $n_3 = n_1 + 2 = 4$ such that $y_3 = 4 y_S = 100$ m. In Table 6, the first column contains source positions at 50 m intervals from –125 m and the first row contains seafloor receiver positions at 100 m intervals from –300 m.

TABLE 6

| | | | Values of (s + r)/2/25 | | | | |
|---|---|---|---|---|---|---|---|
| | | | | r | | | |
| s | −300 | −200 | −100 | 0 | 100 | 200 | 300 |
| −125 | −8.5 | −6.5 | −4.5 | −2.5 | −0.5 | 1.5 | 3.5 |
| −75 | −7.5 | −5.5 | −3.5 | −1.5 | 0.5 | 2.5 | 4.5 |
| −25 | −6.5 | −4.5 | −2.5 | −0.5 | 1.5 | 3.5 | 5.5 |
| 25 | −5.5 | −3.5 | −1.5 | 0.5 | 2.5 | 4.5 | 6.5 |
| 75 | −4.5 | −2.5 | −0.5 | 1.5 | 3.5 | 5.5 | 7.5 |
| 125 | −3.5 | −1.5 | 0.5 | 2.5 | 4.5 | 6.5 | 8.5 |

The table values are computed as $(s+r)/2/y_S$ where $y_S = 25$ m. Similar to previous results, the distance between values in adjacent rows is $h_1 = n_1/2 = 1$ and the distance between values in adjacent columns is $h_3 = n_3/2 = 2$. We selected $n_3 = n_1 + 2$ to obtain 1 between adjacent diagonal values. Consistent with previous results, there are $n_1/2 - 1 = 0$ 'lacking' midpoint values in Table 6. Following diagonals, it is easy to verify that Table 6 indeed contains all values from −8.5 to +8.5 in integer steps. Values ±8.5 and ±7.5 appear once, ±6.5 and ±5.5 appear twice, and all values from −4.5 to +4.5 appear three times.

Similar to equation (2) and Tables 1 and 3, the values in Table 6 depend on $N_1$, $N_2$, $n_1$ and $n_2$. The values after the first row and column do not depend on the bin size $y_S$.

Example 5: Crossline Configuration of Sources and Seafloor Receivers—II

Equation (6) describes a distance between sail lines that leaves no remaining gaps in the coverage parallel to the source lines 119. Replacing $N_2$ and $h_2$, with $N_3$ and $h_3$ yields:

$$N_3 = (N_S - N_1 h_1 + h_1 h_3)/h_3 \qquad (7)$$

where $N_S y_S$ is the distance between adjacent sail lines. Other parameters are explained above.

Inserting $N_S = 300$ m/25 m=12, $N_1 = 6$ sources, $h_1 = 1$ and $h_3 = 2$ from Examples 1 and 4 in equation (7) gives $N_3 = 4$. This means that sail lines 201, 202 halfway between seafloor receiver lines minimise the number of systematic remaining gaps in the crossline coverage, and corresponds to $\Delta C_Y = y_3/2$ in FIG. 3. Note that the values at ±8.5 and ±7.5 in example 4 are covered at both adjacent passes providing a 'crossline fold' of at least 2. This concludes Example 5.

Of course, different values for $N_S$, $N_1$, $h_1$ and $h_3$ in equation (7) yield different values for $N_3$. In particular, we finds that $N_1 = 6$ sources provides a reasonable balance between few remaining gaps and wide coverage per pass with adjacent sail lines 300 m apart. Recall that in Example 1, $Y_1 = 300$ m=48·6.25 m as opposed to 44·6.25=275 m between sail lines required to avoid remaining gaps parallel to the source lines 119.

So far, we have considered midpoints between sources and receivers, i.e. consequences of equation (2). Next, we increase the distance between seafloor receiver lines to 150 m.

Inline Configuration of Sources and Suspended Receivers

FIGS. 5-8 illustrate shot patterns where circles illustrate sources and filled circles illustrate fired sources. A Y-axis represents the crossline distance between acoustic sources in terms of the fixed distance $y_1$ between sources. An x-axis represents the inline distance between shots. We assume a constant vessel speed v, so equal distances $x_0$ correspond to equal time intervals.

Figure 5:
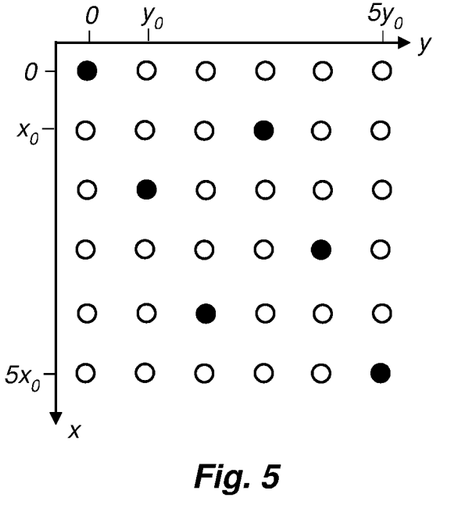

We assume a setup as in Example 1 and a desired inline bin size $x_0 = 6.25$ m for P-waves. Since S-waves do not travel through fluids, the $x_0 \times y_0 = 6.25 \times 6.25$ m$^2$ cells pertain to P-waves. Similar to Example 1, $x_1 = m_1 x_0$ where $m_1$ is an integer. In general, $m_1$ is sufficiently large to permit recharging between shots. In FIG. 5, $m_1 = N_1 = 6$. This yields an inline distance $x_1 = 6 \cdot 6.25 = 37.5$ m between adjacent shot points along a source line 119. At vessel speed v=2.5 m/s, about 4.9 knots, $x_1 = 37.5$ m corresponds to a shot interval $T_S = 15$ s.

For P-waves, the streamers 121-128 determine the inline bin size. In this example, each streamer is 6 000 m long and has suspended receivers every 12.5 m. The streamers are parallel to the y-axis, so cos θ=1, and $x_2 = 12.5$ m. Further, cells with sides equal to the distance between midpoints, here $x_2/2 = 6.25$ m, form a natural bin grid.

FIG. 5 is a 6×6 diagram illustrating a shot pattern with six sources along the y-axis, and one shot per time interval or inline distance $x_0$ along the x-axis. The pattern is repeatable from x=6$x_0$. When v=2.5 m/s and 6$x_0 = 37.5$ m, $T_S = 15$ s is available for recharging each acoustic source.

Figure 6:
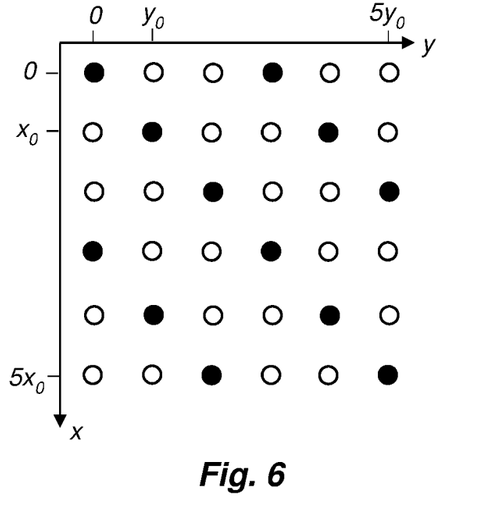

FIG. 6 illustrates a shot pattern in which two sources are fired at each interval i$x_0$. With all other parameters equal to those in Example 1, each source is now fired at intervals of length 3$x_0$. With $x_0 = 6.25$ m and v=2.5 m/s, 3$x_0 = 18.75$ m and $T_S = 7.5$ s. While the denser shot pattern in FIG. 6 provides a denser bin grid on the projection planes 204-206, $T_S = 7.5$ s may be too short to recharge a source 111-116. This illustrates one design parameter that must be left to the actual designer.

Figure 7:
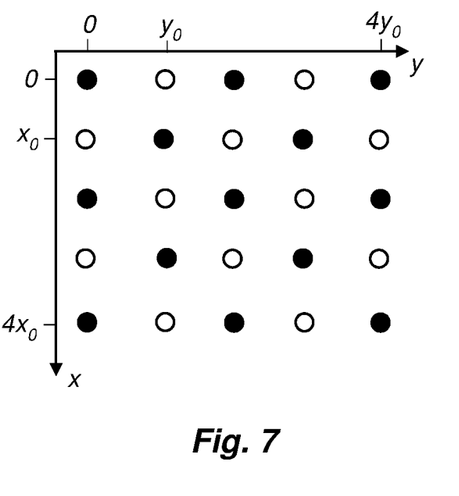

FIG. 7 is a 5×5 diagram corresponding to 5 source lines 119 spaced $y_1$ apart. In general, the number of sources $N_1$, streamers $N_2$ and seafloor lines $N_3$ can be different from 6, 8 and 3 as in previous examples. Further, $x_0$=50 m as in previous examples would yield 250 m between the sail lines 201 and 202 and correspondingly larger fuel expenses for the towing vessel 101. Alternatively, the distance between sail lines might be retained. This would lead to a larger $x_0$ and larger bin sizes in the crossline direction.

Specifically, FIG. 7 shows a pattern in which three sources are fired at each inline interval $y_0$. With parameters from Example 1, each source is now fired every 12.5 m or every 5.0 s. As in the pattern in FIG. 5, the time $T_S$=5.0 s between shots may be too short for practical applications.

Figure 8:
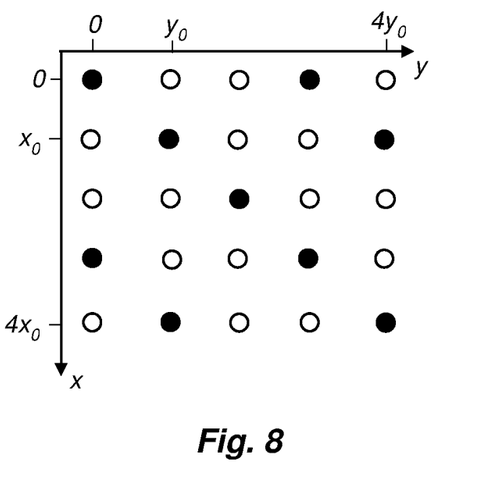

FIG. 8 illustrate a pattern with 5 source lines in which two sources are fired at each $y_0$. This may lead to inline shot intervals similar to those in FIG. 6.

Optimum Bin Size for Converted-Wave 3-D Asymptotic Mapping

A program has been developed to generate fold maps for converted waves recorded in multicomponent 3-D seismic surveys. The asymptotic conversion point is assumed for computing subsurface multiplicity. When a conventional common-midpoint bin size of half the receiver interval (Δr/2) is used, the fold distribution is highly variable and empty rows of bins parallel to the shot lines may result for the case when Vp/Vs=2 and the shot line spacing is an even integer multiple of Δr. Overlapping adjacent bins removes the empty bin problem but does not necessarily result in a smooth fold distribution. The optimum bin size for 3-D converted wave data is Δr/(1+Vs/Vp). Asymptotic binning using this bin dimension was found to produce a smooth fold distribution which is relatively insensitive to Vp/Vs.

In general, numerous combinations are possible. Further, increasing the amount of equipment associated with n, N and $N_2$ and/or improving parameters $x_0$ to $x_2$, $y_0$ to $y_2$ obviously increase investment and operational costs. A cost-benefit analysis generally balances the increased costs against benefits such as reduced bin sizes and better resolution. These are design decisions that must be left to the skilled person designing the survey.

While the invention has been explained by means of examples, the scope of the invention is defined by the following claims.

APPENDIX

| Notation | |
|---|---|
| x, X | Vessel bound and global inline directions |
| y, Y | Vessel bound and global crossline directions |
| $x_0$, $y_0$ | Bin sizes. In examples herein, P-waves have bins $x_0 \times y_0$ = 6.25 × 6.25 m² |
| $x_1$, $y_1$ | Separations of sources 151 |
| $x_2$, $y_2$ | Separations of suspended receivers 152 |
| $x_3$, $y_3$ | Separations of seafloor receivers 153 |
| i, j, k | Running integers |
| $N_1$ | Number of sources. In examples herein, $N_1$ = 6 |
| $N_2$ | Number of streamer lines. In examples herein, $N_2$ = 8 |

APPENDIX-continued

| Notation | |
|---|---|
| $N_3$ | Number of seafloor receiver lines. In examples herein, $N_3$ = 3 to 5 |
| $m_1$, $n_1$ | Integer multipliers for sources: $x_1 = m_1 x_0$ and $y_1 = n_1 y_0$ |
| $m_2$, $n_2$ | Integer multipliers for suspended receivers: $x_2 = m_2 x_0$ and $y_2 = n_2 y_0$ |
| $m_3$, $n_3$ | Integer multipliers for seafloor receivers: $x_3 = m_3 x_0$ and $y_3 = n_3 y_0$ |

The invention claimed is:

1. A method for acquiring subsea seismic data with a vessel towing streamers comprising the steps of:
    defining a horizontal inline axis X that is parallel to a direction the vessel is travelling and a horizontal crossline axis Y perpendicular to the inline axis;
    determining a first distance along the X axis and a second distances along the Y axis based on spatial sampling requirements for S-waves whereby the first and second distances determine a bin size for S-waves;
    determining a third distance along the X axis and a fourth distance along the Y axis based on spatial sampling requirements for P-waves whereby the third and fourth distances determine a bin size for P-waves;
    defining sail lines parallel to the X-axis over a survey area, and for each sail line;
    arranging a set of $N_2$ seafloor receiver lines parallel to the X-axis;
    arranging a set of n equally spaced source lines parallel to the X-axis with equal spacing $y_1$ between the source lines, and at least one source line laying between adjacent seafloor receiver lines;
    moving the source lines along the Y-axis such that the distance between a source line and an adjacent seafloor receiver line becomes equal to or less than twice the second distance;
    defining a crossline distance to a next sail line equal to n times the distance ($y_1$) between adjacent source lines;
    determining a shot interval equal to or less than twice the first distance;
    arranging a set of N streamers over the source lines and seafloor receiver lines such that crossline distances between a source line and an adjacent seafloor receiver line or an adjacent streamer is equal to or less than twice the fourth distance; and
    if necessary, reducing the shot interval to twice the third distance.

2. The method according to claim 1, further comprising the step of deploying seafloor receivers along the seafloor receiver lines at inline distances computed from the second distance and a shot point.

3. The method according to claim 2, further comprising the step of towing a source array with n acoustic sources having equal spacing $y_1$ between adjacent sources at a first depth below a sea surface with a centre of the source array along the sail line.

4. The method according to claim 3, further comprising the step of towing a streamer array at a second depth below the sea surface with a centre of the streamer array along the sail line.

* * * * *

UNITED STATES PATENT AND TRADEMARK OFFICE
CERTIFICATE OF CORRECTION

| | |
|---|---|
| PATENT NO. | : 11,782,178 B2 |
| APPLICATION NO. | : 17/442687 |
| DATED | : October 10, 2023 |
| INVENTOR(S) | : James Wallace |

It is certified that error appears in the above-identified patent and that said Letters Patent is hereby corrected as shown below:

On the Title Page

Title item (54) and in the Specification Column 1 Lines 1-2: Delete "HYBRID SEISMIC ACQUISITION WITH WIDE-TOWED" and insert therefore --HYBRID SEISMIC ACQUISITION WITH WIDE-TOWED SOURCE--

Applicant item (71): Delete "Lajsevåg" and insert therefore --Laksevåg--

Signed and Sealed this
Sixteenth Day of April, 2024

Katherine Kelly Vidal
*Director of the United States Patent and Trademark Office*